Feb. 27, 1923.
H. H. LA VERCOMBE
GRINDING WHEEL TEST DEVICE
Filed Feb. 16, 1922
1,446,977
3 sheets-sheet 3
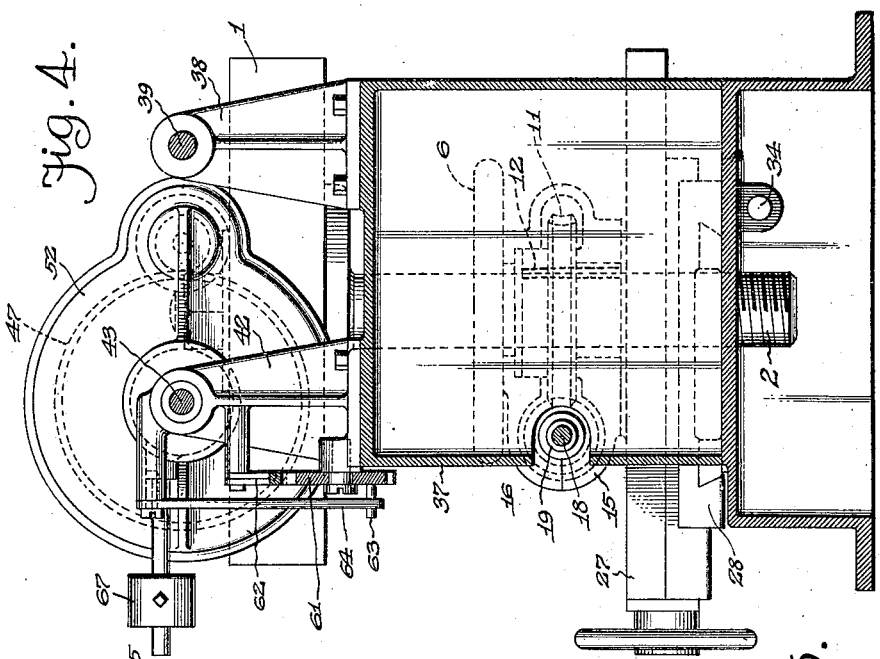

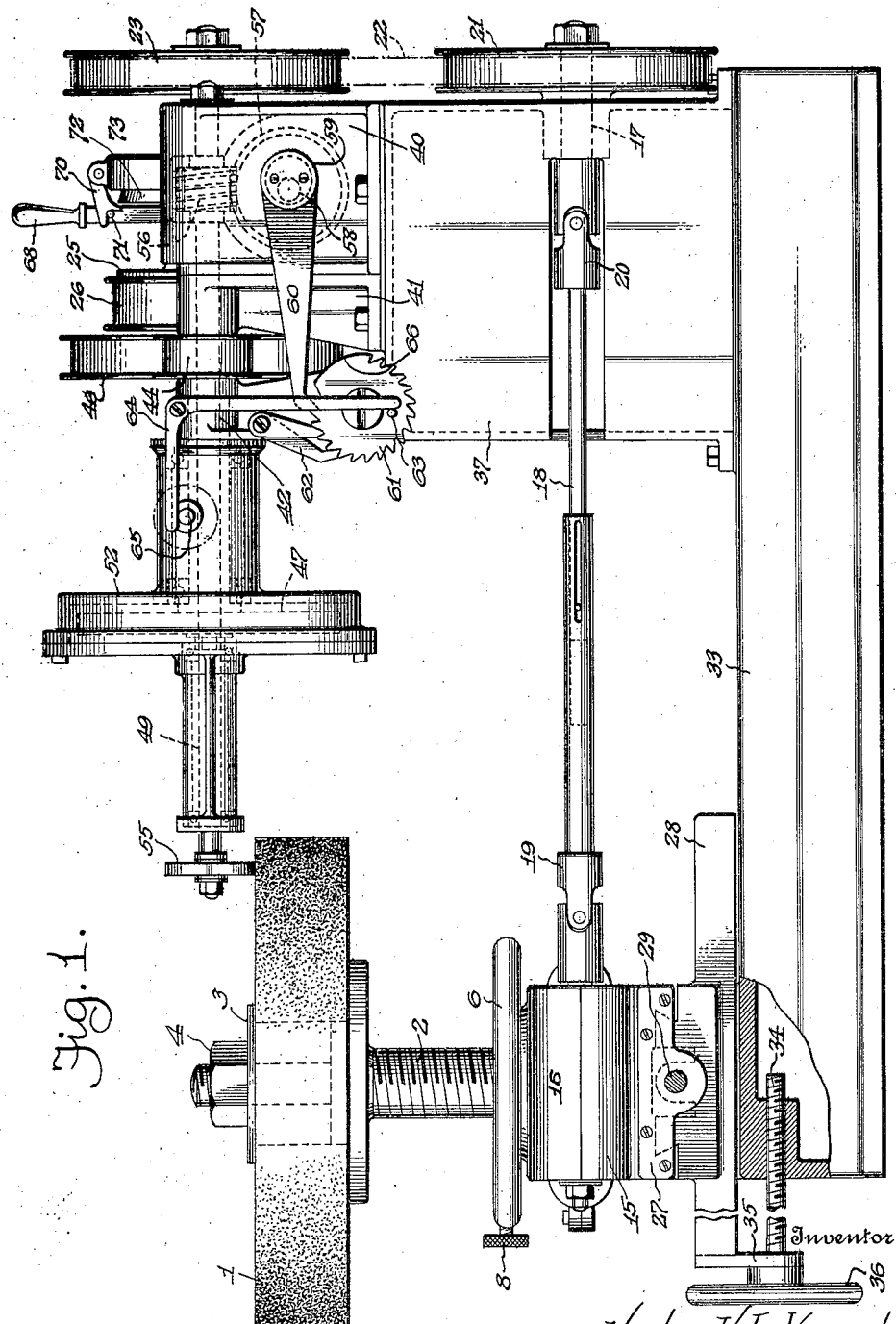

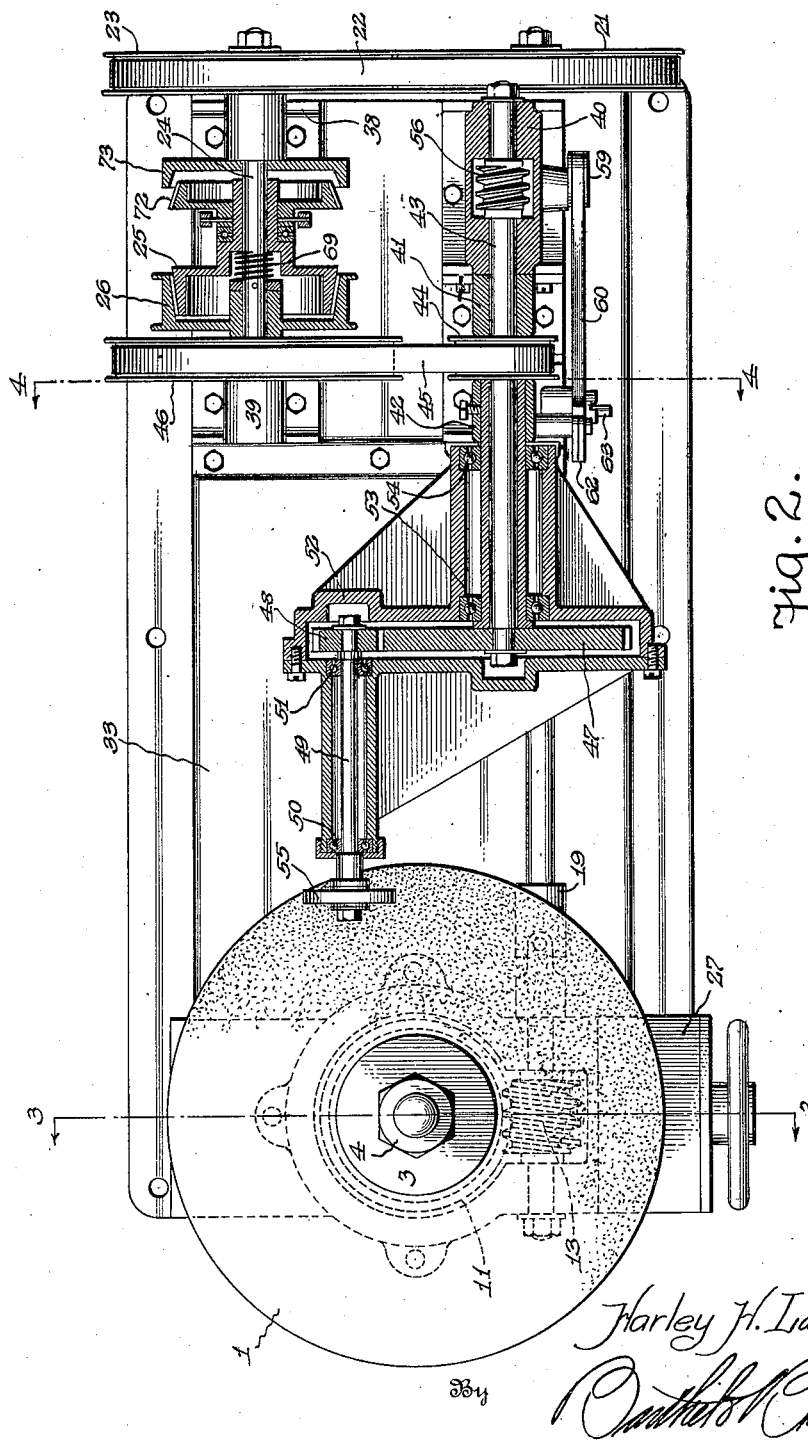

Patented Feb. 27, 1923.

1,446,977

UNITED STATES PATENT OFFICE.

HARLEY H. LA VERCOMBE, OF DETROIT, MICHIGAN.

GRINDING-WHEEL-TEST DEVICE.

Application filed February 16, 1922. Serial No. 537,114.

*To all whom it may concern:*

Be it known that I, HARLEY H. LA VERCOMBE, a citizen of the United States of America, residing at Detroit, in the county of Wayne and State of Michigan, have invented certain new and useful Improvements in Grinding-Wheel-Test Devices, of which the following is a specification, reference being had therein to the accompanying drawings.

This invention relates to a machine for determining the grade of abrasive bodies.

Artificially formed abrading tools are commonly made by mixing particles of an abrasive substance with a plastic binder, which is usually of a ceramic material, and the plastic mixture after being molded into the desired form is subjected to heat to render the binder hard and tenacious.

Tools are graded by the manufacturer according to the coarseness or fineness of the particles of the abrasive material they contain, but the working qualities of the tools depend not only on the size of the abrasive particles, but also upon the quality of the binder. It thus results that tools which have the same commercial grade number, vary greatly, in cutting or abrasive qualities.

The principal object of the present invention is to provide a means for determining the rapidity of cutting action of an artificial abrasive tool whereby grades may be established, based upon cutting quality.

A futher object of the invention is to provide a testing apparatus which may be used upon an abrasive tool without causing injury to the tool.

Further objects of the invention will be apparent as the description proceeds, reference being had to the accompanying drawing, forming a part of the specification, in which Figure 1 is a side elevation of a preferred form of my invention;

Fig. 2 is a plan view;

Fig. 3 is a vertical section on the line 3—3 of Fig. 2, looking in the direction indicated by the arrows;

Fig. 4 is a section on the line 4—4 of Fig. 2, looking in the direction indicated by the arrows, and Fig. 5 is a detail view of the nut and its hand wheel forming an adjustable bearing for the tool support.

The machine illustrated in the drawings is particularly intended for use in testing grinding wheels, though it is obvious that it might be modified for use with abrasive tools of other configurations.

A wheel 1 to be tested is clamped upon a screw threaded support 2, by means of a washer 3 and nut 4. A nut 5 in engagement with the screw threaded shank of the support 2 has a hand wheel 6 mounted thereon and held in engagement therewith, by means of a pin 7 screw threaded at its outer end as indicated at 8, the pin being of a length such that it will extend through the nut 5 into a groove 9 in the screw threaded shank of the support 2, as indicated in Fig. 5.

The nut 5 rests upon the hub 10 of a worm gear 11, having a spline 12 engaging the groove 9 of the support 2. A worm 13 in mesh with the worm wheel 11, is mounted on a shaft 14 journaled in the casing 15. A cover 16 secured to the casing 15, encloses the worm and worm wheel. The hand wheel 6 is made separate from the nut 5 to permit a ready assembly of the parts.

The shaft 14 is connected to a shaft 17 by means of a telescopic shaft 18 and two universal joints 19 and 20. Upon the shaft 17 is secured a pulley 21 connected by a belt 22 with a pulley 23 secured to the shaft 24. Slidably mounted upon the shaft 24 is a clutch 25 adapted to engage the interior of the main driving pulley 26.

The casing 15 is mounted upon a reciprocating carriage 27 capable of longitudinal adjustment upon a carriage 28 by means of a screw 29. The screw 29 is swiveled in a depending flange 30 of the carriage 27 and is operated by a hand wheel 21. The screw threaded portion of the adjusting screw 29 engages a threaded opening in the flange 32 of the carriage 28.

The carriage 28 is mounted for reciprocation upon the bed 33. Longitudinal movement is imparted to the carriage by means of the screw 34 engaging a screw threaded opening in the bed and having a swiveled connection with a flange 35 depending from one end of the carriage 28. The screw 34 is operated by a hand wheel 36. Upon the opposite end of the bed 33 from the carriage 28, is a casing 37 upon which is mounted standards 38 and 39, in which are bearings for the shaft 24.

Similar standards 40, 41 and 42 also mounted upon the casing 37, have formed therein bearings for the shaft 43. Centrally mounted upon the shaft 43 is a pulley 44 connected by a belt 45 with a pulley 46 secured to the shaft 24. Upon the forward end of the shaft 43 is secured a gear 47, in mesh with a gear 48 secured to one end of a shaft 49, the shaft 49 being mounted in ball bearings 50 and 51 in a casing 52. The casing 52 is mounted for pivotal movement about the axis of the shaft 43 upon ball bearings 53 and 54.

Upon the outer end of the shaft 49 is mounted a metallic disk 55 which in a normal operation of the machine rests upon the upper surface of the wheel 1, while the latter is being tested.

The disk 55 being rotated through the shaft 49, gears 48 and 47, shaft 43, belt 45 and pulley 46, from the main drive shaft 24, bears upon the upper surface of the grinding wheel 1, preferably at a point near its periphery and while the disk 55 is being rotated, the wheel 1 is also rotated about its axis by means of the worm gear 11, worm 13, shafts 14, 18 and 17, pulley 21, belt 22, pulley 23 and drive shaft 24. Upon the shaft 43 is a worm 56 in mesh with a worm wheel 57 mounted upon a shaft 58 having secured to the outer end thereof an eccentric 59 and upon this eccentric is pivotally mounted one end of a pawl 60, the opposite end of the pawl being in engagement with ratchet 61, dogs 62 pivoted upon the standard 42 engage the teeth of the ratchet 61 to prevent reverse movement so that the ratchet will be maintained in the angular position to which it is moved by the reciprocation of the pawl 60 as the eccentric 59 is rotated about the shaft 58. Projecting from one face of the ratchet 61 is a pin 63 which is illustrated in Fig. 1 as in contact with the lower end of a bell crank lever 64, the end of the other leg of the bell crank resting upon a rod 65 projecting from the casing 52.

At each complete rotation of the worm wheel 57, the pawl 60 is pushed forward and withdrawn, the ratchet 61 being given a partial rotation and held at the end of its movement by the engagement of a dog 62 with one of its teeth. When the ratchet has been rotated to the position shown in Fig. 1, the pin 63 will come in contact with the bell crank lever 64 and at the next stroke of the pawl 60, the bell crank lever will be swung around its pivot and by the pressure of the other leg of the lever upon the rod 65, the casing 52 will be caused to swing about its pivotal axis and the disk 55 will be lifted out of engagement with the grinding wheel 1.

A dwell 66 is formed upon the periphery of the ratchet 61 and upon this dwell the end of the pawl 60 will ride without causing further rotation of the ratchet 61 after the bell crank lever has been swung enough to lift the disk 55.

By the means just described, it will be evident that the disk 55, being geared to the operating means for the pawl 60 will be given a definite number of rotations during the rotation of the ratchet 61 from a point substantially 180° back from that shown in Fig. 1, at which point the pin 63 lies in contact with the bell crank 64 with the disk 55 in contact with the upper surface of the grinding wheel to be tested, to the point at which the pin 63 again comes in contact with the bell crank lever to lift the disk 55 out of contact with the wheel 1.

The amount of pressure applied to the disk 55 may be regulated by means of an adjustable weight 67 mounted upon the arm 65.

Starting with a disk 55 of a known diameter and of a known composition, and causing the disk to be rotated for a definite number of turns in contact with a rotating wheel, the cutting quality of the wheel will be indicated by the amount of material removed from the periphery of the disk 55 during the time it is rotated in contact with the abrasive tool. The grinding wheel will be given one or more complete revolutions during the testing period so that the disk 55 will be brought continually into contact with fresh cutting portions of the tool under test, and since the disk is rotated, a fresh portion of the metal is presented at each instant, to the abrading action of the tool. The grinding wheel will be given one or more complete revolutions during the testing period so that the disk 55 will be brought continually into contact with fresh cutting portions of the tool under test, and since the disk is rotated, a fresh portion of the metal is presented at each instant, to the abrading action of the tool.

A hand lever 68 is used to slide the clutch member 25 longitudinally of the shaft 24 against the action of a spring 69 into engagement with the clutch face of the drive pulley 26 where it may be held by the engagement of a pawl 70, with a projection 71 upon the lever. After the completion of the cycle, by the engagement of the pawl 60 with the dwell 66, the lever 68 may be released, whereupon the spring 69 will operate to thrust a clutch member 72 into engagement with a co-operating brake cone 72 into a tapering seat formed in a co-operating brake member 73 secured to the standard 38.

The position of the grinding wheel to be tested may be adjusted horizontally by means of the reciprocating carriages 27 and 28, the longitudinal movement of each carriage lying substantially at right angles to that of the other and the vertical adjustment is secured by means of the hand wheel 6 causing rotation of the nut 5 upon the screw threaded support 2.

If an abrasive tool other than a wheel is to be tested, the belt 22 may be removed from the pulleys 21 and 23 and the tool to be tested may then be reciprocated in any direction horizontally, by means of the separate or co-joint action of the carriages 27 and 28, the tool being held upon the support 2 or any other suitable form of support by a clamping means adapted to the shape of the abrasive tool. It will be seen that the rotating disk 55 may thus be brought successively into contact with all portions of the cutting surface of an abrasive tool, so that the amount of material removed will represent the average cutting quality of the entire surface tested.

It will be evident that any modifications which will suggest themselves to those skilled in the art may be made in the apparatus shown and described, without departure from the principle thereof, or sacrificing any of its advantages and while in conformity with the statute, I have described a specific embodiment of my invention, it will be understood that I do not wish to be limited to the specific details of the construction shown, but that I wish to claim the invention in all of its modifications within the legitimate and valid scope of the appended claims.

I claim:

1. A machine for determining the grade of abrasive bodies, having in combination means for supporting a body, a disk, power actuated means for rotating the disk in contact with the body, and means for moving the disk away from the body when the disk has been given a predetermined number of rotations, said means for moving the disk away from the body being controlled by the means causing rotation of the disk.

2. A machine for determining the grade of abrasive bodies, having in combination means for supporting a body, a disk adapted for engagement with said body and having means for adjusting the pressure of the disk upon the body, means for rotating the disk, and means acting upon the pressure adjusting means to move the disk away from the body when the disk has made a predetermined number of rotations, said means for moving the disk away from the body being controlled by the means causing rotation of the disk.

3. A machine for determining the grade of abrasive bodies, having in combination means for supporting a body, means for rotatably supporting a disk for movement toward and away from said body, an adjustable weight for varying the amount of pressure of the disk upon the abrasive body, a lever adapted to act upon the disk-supporting means to remove the disk from contact with the body, means for rotating the disk, and means geared to the disk-rotating means adapted to move the lever after a predetermined number of rotations of the disk.

4. A machine for determining the grade of abrasive bodies, having in combination means for supporting a body for rotation, means for supporting a disk for movement toward and away from said body, means for rotating said disk, and means geared to the disk-rotating means to move the disk away from said body after a predetermined number of rotations of said disk.

5. A machine for determining the grade of abrasive bodies, having in combination a disk, means for rotating said disk, means for supporting an abrasive body for movement to present various portions thereof to the periphery of said disk, and means for moving said disk away from the body when the disk has made a predetermined number of rotations, said means for moving the disk away from the body being controlled by the means causing rotation of the disk.

6. A machine for determining the grade of abrasive bodies, having in combination means for supporting a body, a swinging frame, a disk mounted for rotation on said frame, means for rotating said disk, a lever mounted to engage the swinging frame to swing said disk away from said body, means geared to said disk-rotating means and adapted to engage said lever whereby said lever will be moved to swing said frame after a predetermined number of rotations of said disk.

In testimony whereof I affix my signature in presence of two witnesses.

HARLEY H. LA VERCOMBE.

Witnesses:
ANNA M. DORR,
OTTO F. BARTHEL.